(12) United States Patent
Gmür

(10) Patent No.: US 7,425,243 B2
(45) Date of Patent: Sep. 16, 2008

(54) METHOD OF JOINING TWO WORKPIECES WITHOUT EXTRANEOUS MATERIALS AND ALSO WORKPIECE JOINED BY THIS METHOD

(75) Inventor: Max Gmür, Mosnang (CH)

(73) Assignee: Weidmann Plastics Technology AG, Rapperswil (CH)

( * ) Notice: Subject to any disclaimer, the term of this patent is extended or adjusted under 35 U.S.C. 154(b) by 355 days.

(21) Appl. No.: 10/958,340

(22) Filed: Oct. 6, 2004

(65) Prior Publication Data

US 2005/0079373 A1      Apr. 14, 2005

(30) Foreign Application Priority Data

Oct. 9, 2003      (CH) .................................... 1717/03

(51) Int. Cl.
   *B29C 65/00*      (2006.01)
(52) U.S. Cl. .................. 156/272.2; 156/281; 156/273.3
(58) Field of Classification Search ............. 156/272.2, 156/281, 306.3, 308.2, 292, 273.3; 264/1.38, 264/446, 494
   See application file for complete search history.

(56) References Cited

U.S. PATENT DOCUMENTS

| 4,470,856 | A | * | 9/1984 | Little et al. .................. 156/64 |
| 4,803,021 | A | * | 2/1989 | Werth et al. ................. 264/400 |
| 5,160,560 | A | * | 11/1992 | Welkowsky et al. ......... 156/154 |
| 5,512,123 | A | * | 4/1996 | Cates et al. ............... 156/272.6 |
| 5,580,407 | A | * | 12/1996 | Haisma et al. .............. 156/153 |
| 5,846,638 | A | * | 12/1998 | Meissner ..................... 428/220 |
| 5,879,757 | A | * | 3/1999 | Gutowski et al. ........... 427/491 |
| 6,752,966 | B1 | * | 6/2004 | Chazan ....................... 422/102 |
| 6,838,156 | B1 | * | 1/2005 | Neyer et al. ................. 428/172 |
| 2002/0129833 | A1 | * | 9/2002 | Drzal et al. ..................... 134/1 |

* cited by examiner

*Primary Examiner*—Jeff H Aftergut
*Assistant Examiner*—Daniel McNally
(74) *Attorney, Agent, or Firm*—Sughrue Mion, PLLC

(57) ABSTRACT

In a method of joining two workpieces (10, 16) without extraneous materials to produce a workpiece 25 which is joined over a joining area (24) which is formed by two fully adjoining surfaces (13, 13') of the two workpieces (10, 16), with the first workpiece (16) being of plastic and the second workpiece (10) being of a material different from plastic, a strong bond is achieved even when the coefficients of thermal expansion of the workpieces are different by activating at least the surface (13') of the first workpiece (16) by irradiation with high-energy radiation in a first step, bringing the surfaces (13, 13') of the workpieces (10, 16) into contact in a second step and pressing the two workpieces (10, 16) against one another at room temperature, in particular at a temperature of from 15° C. to 30° C., to join them at the surfaces (13, 13').

9 Claims, 2 Drawing Sheets

METHOD OF JOINING TWO WORKPIECES WITHOUT EXTRANEOUS MATERIALS AND ALSO WORKPIECE JOINED BY THIS METHOD

TECHNICAL FIELD

The present invention relates to the field of joining without extraneous materials. It provides a method of joining two workpieces without extraneous materials and also a workpiece joined by this method.

PRIOR ART

Plastic hybrid joining without extraneous materials refers to the joining of two workpieces made of materials having different chemical and/or physical and/or mechanical and/or optical properties, with one workpiece being of plastic and the other workpiece being of a material different from plastic (e.g. ceramic, semiconductor (silicon), glass, metal). The bonding of the two workpieces is effected without extraneous material (e.g. adhesive).

Plastic hybrid joining without extraneous materials can be used:

a) for joining two workpieces, with one or both workpieces being able to be microstructured and/or nanostructured and one workpiece being of plastic and the other workpiece not being of plastic. The joined workpiece comprises, inter alia, the following elements or functions:
sensors and actuators;
chemical, physical, mechanical and optical filters;
entries/exits and conduits for liquids, gases and light;
interface to the surroundings;
protection against damaging environmental influences.

b) wherever a plastic workpiece has regions which have increased chemical, physical, mechanical and optical requirements which cannot be met by plastic and for this reason a workpiece made of another nonplastic material which has the required properties is used at such points.

The two workpieces have to be bonded without extraneous materials, so that:

a) the functions of the workpieces are not impaired; and
b) no reaction and/or contamination takes place between the joining zone and the liquid and gaseous media (e.g. chemical and biological substances) which flow through the joined workpiece during later use and come into contact with the joining zone.

Conventional plastic joining methods which do not use extraneous materials, e.g. ultrasonic or frictional welding, are not suitable for microstructured and/or nanostructured workpieces because the microstructures and/or nanostructures can be damaged or destroyed, in particular when the microstructures and/or nanostructures are located on the surface.

In the case of laser welding, it is difficult to introduce such an amount of heat that the microstructures and/or nanostructures located on the surface of the workpiece, which is at the same time the joining area, are not damaged or destroyed by the heat introduced. In addition, laser welding is a sequential joining method and is therefore uneconomical for large-area joining.

Thermal joining with or without surface activation is used successfully for joining microstructured and/or nanostructured workpieces when both workpieces comprise the same type of plastic. In the case of thermal joining without surface activation, the joining temperature has to be above the glass transition temperature of the plastic in order to bond the two workpieces. In the case of thermal joining with surface activation, the two workpieces are durably bonded even below the glass transition temperature. The plastic surface is in this case activated in a plasma or by means of UV radiation (wavelength: 250-280 nm). However, this activation is not sufficient to join the two workpieces firmly together at room temperature. Thus, heat energy has to be supplied for joining without surface activation and also for joining with surface activation in order to form a durable bond between the two workpieces. Joining with or without surface activation is therefore not suitable for plastic hybrid joining because, owing to the different coefficients of expansion of the two workpieces to be joined, large tensile stresses occur on cooling and these finally lead to rupture of the bond.

SUMMARY OF THE INVENTION

It is an object of the invention to provide a method of joining without extraneous materials, which method is suitable for joining a workpiece made of plastic with a workpiece made of a material different from plastic (plastic hybrid joining), can be inserted in a simple fashion into a production process, gives a strong bond and is particularly, but not exclusively, suitable for workpieces having microstructures and/or nanostructures.

The key aspect of the invention is that the surface to be joined of the plastic workpiece is activated before actual joining by irradiation with high-energy radiation so that pressing together of the surfaces even at room temperature, i.e. without thermal energy being supplied, gives a strong bond between the workpieces. Because the joining process can be carried out at room temperature, all problems associated with different coefficients of thermal expansion no longer occur. It is therefore possible, in particular, to introduce microstructures and/or nanostructures present in the workpieces undamaged into the joined workpiece.

In a preferred embodiment of the method of the invention, UV radiation having a wavelength of less than 200 nm, in particular about 172 nm, is used for irradiation of the surface of the first workpiece. This measure alone enables excellent bonding to be achieved.

Bonding is improved further when, according to a further embodiment, the surface of the second workpiece is also irradiated with high-energy radiation, preferably UV radiation having a wavelength of less than 200 nm, in particular about 172 nm, before the second step. This irradiation also leads to some degree of surface activation, but serves primarily to clean the surface.

A further improvement can be achieved when the surface of the second workpiece is firstly cleaned, in particular by means of a wet- or dry-chemical process.

In particular, it has been found to be useful in practice for an Osram Xeradex™20 excimer lamp to be used as UV radiation source, for the surfaces to be only a few millimeters away from the radiation source during irradiation of the surfaces and for irradiation to be carried out for a period of from 10 s to 600 s.

The joining step leads to particularly good results when, according to another embodiment of the invention, the two workpieces are pressed together between two parallel pressing platens in a joining press, when the pressure is from 300 to 600 bar and is applied for a period of from 10 s to 600 s and when the joined workpiece is stored at room temperature for a prolonged period, in particular several days, after completion of the third step.

It is preferred that the first workpiece comprises a cycloolefin copolymer (COC) or polymethyl methacrylate (PMMA) and the second workpiece comprises silicon or glass.

In order to avoid contamination reliably in the critical phases of the process, it is advantageous for the irradiation of the workpiece or workpieces to be carried out in a clean-room and for the second step to be carried out in a clean-room.

The joined workpiece of the invention, in which a first workpiece made of a plastic and a second workpiece made of a material different from plastic are joined to one another on a joining area without extraneous materials is distinguished by a method according to the invention having been used for joining.

In particular, microstructures and/or nanostructures have been formed in the workpiece.

BRIEF DESCRIPTION OF THE FIGURES

The invention will be illustrated below by means of examples and the drawing. In the drawing.

WAYS OF PERFORMING THE INVENTION

Figure 1:
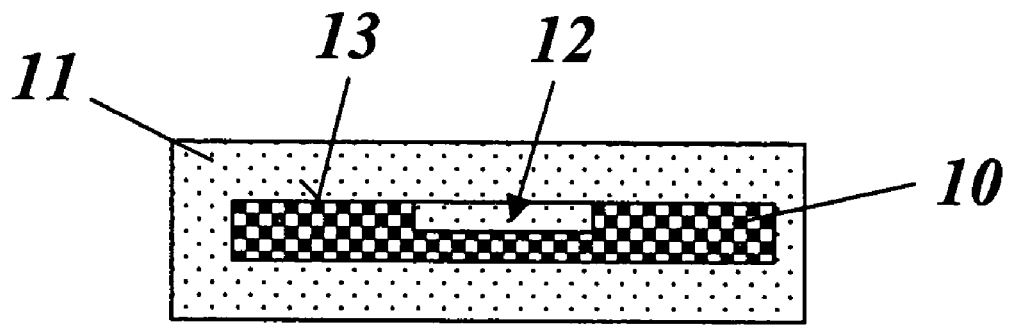
FIG. 1 shows a schematic view of the primarily wet- or dry-chemical cleaning of the second workpiece which does not consist of plastic, shown in cross section.

In the newly developed method of the invention for plastic hybrid joining at room temperature without extraneous materials, the workpiece which is not made of plastic is firstly wet- or dry-chemically cleaned to free the surface of organic and inorganic residues.

The surfaces which are important for joining of the two workpieces are subsequently irradiated with UV irradiation having a wavelength of less than 200 nm. The shorter the wavelength of the UV radiation, the higher its energy. At wavelengths of less than 200 nm, the UV radiation has sufficiently high energy for it to break the molecule chains on the plastic surface, so that free bonds are formed. In addition, atomic oxygen (O) and ozone ($O_3$) are formed in the vicinity of the UV radiation. The oxygen radicals and the ozone are very reactive and likewise contribute to activation of the plastic surface. After UV irradiation, the surface energy of the plastic workpieces is significantly increased:

Plastic surface energy without activation: 20-40 mN/m

Plastic surface energy with UV activation: 60-72 mN/m (72 mN/m=wetting with water)

The UV irradiation of the workpiece which is not made of plastic serves not so much to activate the surface as rather to clean the critical surfaces. A strong bond to the plastic workpiece can in principle also be produced without UV radiation of the workpiece which is not made of plastic.

Subsequent to UV irradiation, the two workpieces are placed on top of the other with the two activated or cleaned surfaces in contact. However, the two surfaces are still too far apart to be able to react with one another. Application of pressure brings the two surfaces sufficiently close together to be able to react with one another. The minimum pressure necessary for a reaction is dependent on the type of plastic and on the planarity of the surfaces of the two workpieces. The maximum pressure is when the plastic is plastically deformed. The application of pressure can take from a few seconds to a few minutes. Subsequent to joining, the press (joining press) is released and the joined workpiece is taken out. The two joined workpieces can then only be separated by application of force. If stress whitening occurs on rupture, this indicates that rupture has occurred within the plastic and not at the interface between the two workpieces. The strength of the composite workpiece is increased further by storage at room temperature for a number of days.

The joining process takes place at room temperature. Differences in the coefficients of thermal expansion of the two workpieces therefore do not matter. After storage of the joined workpiece, the bond is so strong that it will endure temperature increases to at least 60° C. without delamination occurring on subsequent cooling.

The new method has hitherto been used successfully for plastic hybrid joining without extraneous materials in the case of the following joining pairs:

silicon/COC (cycloolefin copolymer),
silicon/PMMA (polymethyl methacrylate, Plexiglas),
glass/COC, and
glass/PMMA.

Typical joining parameters are:

UV radiation: 10 s-600 s depending on distance from the UV radiation source (a few millimeters);

application of pressure: 300-600 bar for 10 s-600 s;

an Osram XERADEX™20 excimer lamp was used for UV radiation (xenon-filled; wavelength: 172 nm).

The process sequence will be described once more with reference to FIGS. 1 to 5:

As shown in FIG. 1, the second workpiece 10 which does not consist of plastic and has, for example, a microchannel 12 as microstructure is cleaned by removing organic and inorganic residues on the surface 13 by means of a wet- and/or dry-chemical cleaner 11 and cleaning process.

Figure 2:
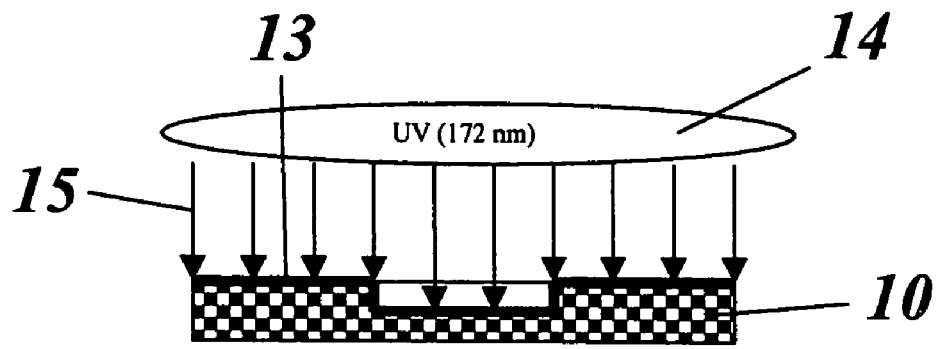
FIG. 2 shows the subsequent surface cleaning and activation of the second workpiece by irradiation with short-wavelength (172 nm) UV radiation.
Figure 3:
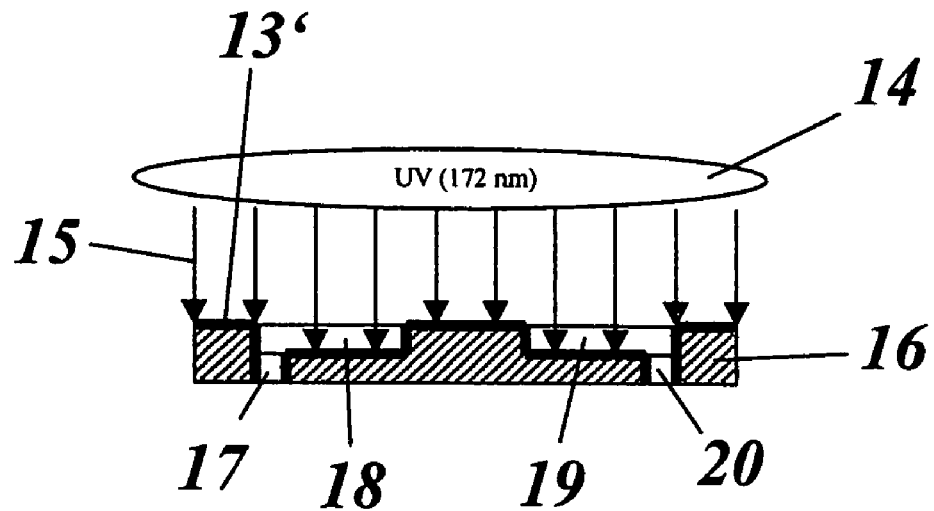
FIG. 3 shows the surface activation of the first workpiece consisting of plastic, shown in cross section, by irradiation with short-wavelength (172 nm) UV radiation.

FIGS. 2 and 3 show the irradiation of the surfaces 13 and 13' of the second workpiece 10 and the first workpiece 16 consisting of plastic with UV radiation 15 having a wavelength of less than 200 nm (172 nm) from a UV source 14. The plastic surface 13' of the first workpiece 16, which likewise has microchannels 18, 19 and through-holes 17, 20 as microstructures, is thus activated (the activated surfaces are indicated by thick lines in FIGS. 2 to 5). The UV irradiation of the surface 13 of the second workpiece 10 is not absolutely necessary. To avoid contamination of the surfaces 13, 13', this process step (irradiation) should be carried out in a clean-room.

Figure 4:
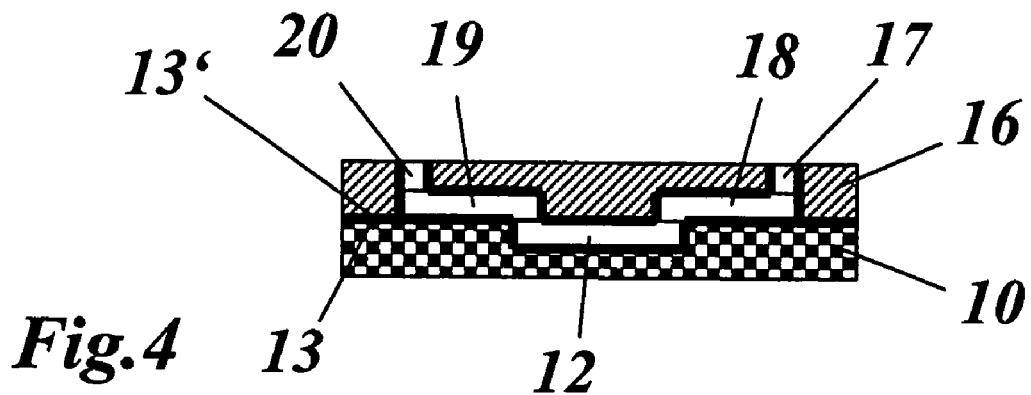
FIG. 4 shows the placing of the two workpieces on top of one another with the irradiated surfaces adjoining one another.

In FIG. 4, the two prepared (surface-cleaned and surface-activated) workpieces 10 and 16 are laid on top of one another so that the two activated surfaces 13, 13' are in contact over a large area and react with one another. In order for the pressure due to the applied force F to be distributed uniformly over the entire joining area 24, the two pressing platens 22, 23 of the joining press 21 have to be very flat and parallel.

Figure 5:
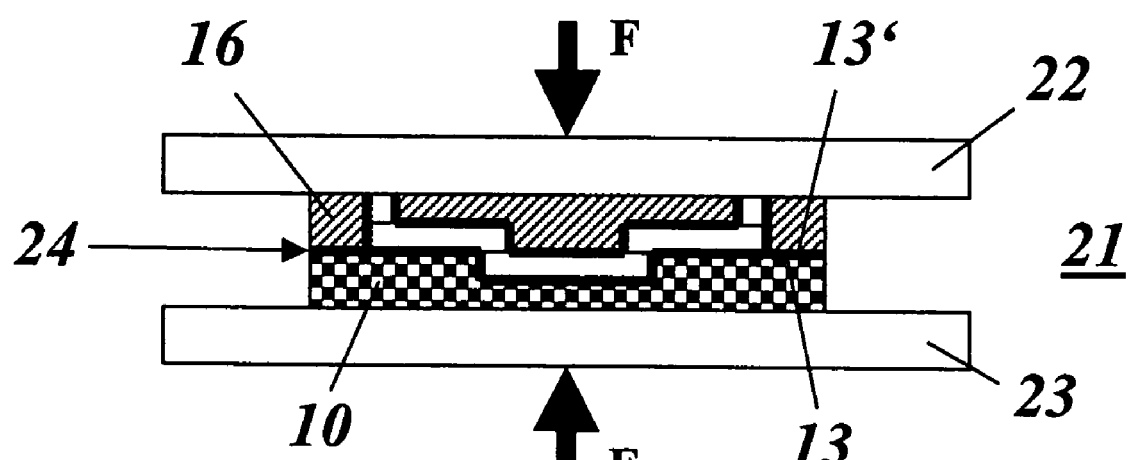
FIG. 5 shows the joining step carried out at room temperature and under pressure in a joining press.
Figure 6:
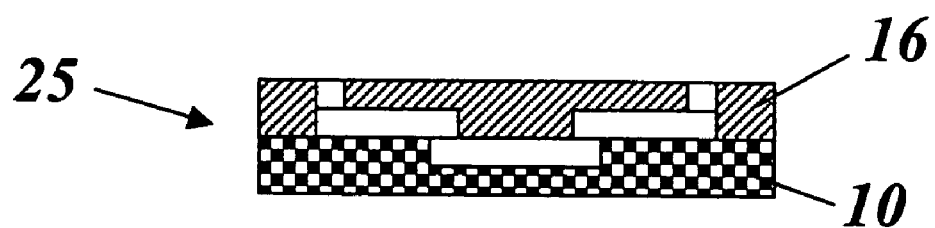
FIG. 6 shows a cross-sectional view of the finished joined workpiece with its microstructures and/or nanostructures.

FIG. 5 shows the joined workpiece 25 which has been taken from the joining press 21 after the joining press 21 has been released. The strength of the bond can be increased further by subsequent storage for a few days at room temperature.

The advantages of the new plastic hybrid joining method are as follows:

Joining of a plastic workpiece with a workpiece made of a nonplastic material under mild conditions, with one

- workpiece or both workpieces being able to be microstructured and/or nanostructured.
- Joining of workpieces having different chemical, physical and mechanical properties, in particular of workpieces having different coefficients of thermal expansion since joining is effected at room temperature.
- Joining without extraneous materials, resulting in little apparatus being required for joining and there being no risk of the joining zone coming into contact with, reacting with or contaminating the material to be conveyed (e.g. in a microchannel).
- Economical joining of large areas.
- The activation of the plastic surface by irradiation with UV radiation is very economical because the cycle time is short and activation occurs at ambient pressure.
- In contrast to surface activation in the plasma, UV radiation produces no high-energy ions which could damage the surface of the plastic workpiece.
- The UV radiation source can be integrated into a production line in a simple fashion.

LIST OF REFERENCE NUMERALS

10 Workpiece (of a material different from plastic, e.g. ceramic, silicon, glass, metal, etc.
11 Cleaner (wet- or dry-chemical)
12 Microchannel
13, 13' Surface
14 UV radiation source ($\lambda$<200 nm)
15 UV radiation
16 Workpiece (of plastic, e.g. COC or PMMA)
17 Through-hole
20 Through-hole
18 Microchannel
19 Microchannel
21 Joining press
22 Press platen
23 Press platen
24 Joining area
25 Joined workpiece
F Force

The invention claimed is:

1. A method of joining two workpieces, at least one of which is micro-structured or nano-structured, without extraneous materials to produce a workpiece which is joined over a joining area which is formed by two fully adjoining planar surfaces of the two workpieces, with the first workpiece being of plastic and the second workpiece being of a material different from plastic, which comprises:

activating at least the surface of the first workpiece by radiation in a first step, which radiation has sufficiently high energy for it to break the molecule chains on the plastic surface, so that free bonds are formed, bringing the irradiated surfaces of the first workpiece and a surface of the second workpiece into contact in a second step, and in a third step, pressing the two workpieces against one another with a force and for a period of time and in a temperature range of from 15° C. to 30° C., to join them at the surfaces in contact with one another because the free bonds on the surface of the first workpiece and increased surface energy cause bonding to the surface of the second workpiece, wherein pressure is applied to the two workpieces in the third step between two parallel pressing platens in a joining press at a pressure from 300 to 600 bar and for a period of from 10 s to 600 s, and wherein the second workpiece comprises silicon or glass.

2. The method as claimed in claim 1, wherein UV radiation having a wavelength of less than 200 nm, in particular about 172 nm, is used for irradiating the surface of the first workpiece.

3. The method as claimed in claim 1, wherein the surface of the second workpiece is also irradiated with high-energy radiation, preferably UV radiation having a wavelength of less than 200 nm, in particular about 172 nm, prior to the second step.

4. The method as claimed in claim 1, wherein the surface of the second workpiece is firstly cleaned, in particular by means of a wet- or dry-chemical process.

5. The method as claimed in claim 1, wherein an excimer lamp is used as source of the UV radiation, the surfaces are only a few millimeters away from the radiation source during irradiation of the surfaces and irradiation is carried out over a period of from 10 s to 600 s.

6. The method as claimed in claim 1, wherein the joined workpiece is stored at room temperature for a prolonged period, in particular several days, after completion of the third step.

7. The method as claimed in claim 1, wherein the first workpiece comprises a cycloolefin copolymer (COC) or polymethyl methacrylate (PMMA).

8. The method as claimed in claim 1, wherein irradiation of the workpiece or the workpieces is carried out in a clean-room.

9. The method as claimed in claim 1, wherein the second step is carried out in a clean-room.

* * * * *